United States Patent [19]

Takano et al.

[11] 4,168,365
[45] Sep. 18, 1979

[54] FLAME-RETARDANT PHENOLIC RESIN

[75] Inventors: Hidekazu Takano; Toshiharu Mikawa; Kazuhiko Nemoto, all of Kadoma, Japan

[73] Assignee: Matsushita Electric Works, Ltd., Kadoma, Japan

[21] Appl. No.: 856,067

[22] Filed: Nov. 30, 1977

[30] Foreign Application Priority Data

May 14, 1977 [JP] Japan .................................. 52-56677
Jun. 15, 1977 [JP] Japan .................................. 52-71530

[51] Int. Cl.$^2$ ............................................ C08G 65/40
[52] U.S. Cl. .................................... 528/151; 528/137; 528/138; 528/142; 528/143; 528/144; 528/145; 528/147; 528/150; 528/152; 528/155; 528/158; 528/167; 528/169
[58] Field of Search ................. 260/47 UA, 47 P, 49, 260/61; 528/130, 137, 138, 142, 143, 144, 145, 147, 150, 151, 152, 155, 158, 167, 169

[56] References Cited

U.S. PATENT DOCUMENTS

| 3,146,254 | 8/1964 | Boozalis et al. ........................ 260/461 |
| 3,787,360 | 1/1974 | Daigle et al. ......................... 260/47 P |

Primary Examiner—Lester L. Lee
Attorney, Agent, or Firm—Sughrue, Rothwell, Mion, Zinn and Macpeak

[57] ABSTRACT

A flame-retardant phenolic resin which comprises the product obtained on
(a) reacting at least one halogenated compound represented by the general formula (I)

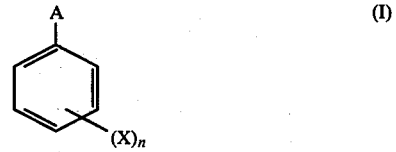

wherein A is —CH=CH$_2$ or —O—CH$_2$—CH=CH$_2$, X is a chlorine atom or a bromine atom, and n is an integer of 1, 2 or 3, with at least one phenol in the presence of an acidic catalyst; and
(b) reacting the resulting reaction product with at least one phosphoric acid ester compound containing a phenolic OH group represented by the general formula (II), (III) or (IV).

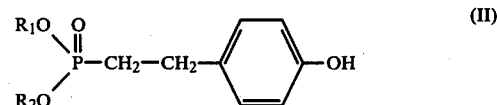

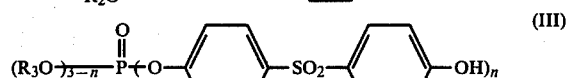

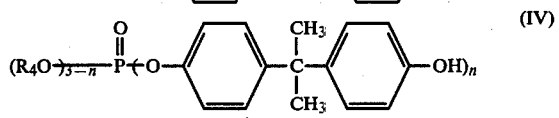

wherein R$_1$, R$_2$, R$_3$ and R$_4$ each represents an unsubstituted or substituted hydrocarbyl group, where R$_1$ and R$_2$ may be the same or different, and n is 1, 2 or 3, and at least one aldehyde or a precursor thereof in the presence of an acidic or alkali catalyst; and a process for producing the flame-retardant phenolic resin.

24 Claims, No Drawings

FLAME-RETARDANT PHENOLIC RESIN

BACKGROUND OF THE INVENTION

1. Field of the Invention

The present invention relates to a flame-retardant phenolic resin and to a process for producing the same, and, more particularly, it relates to a flame-retardant phenolic resin having excellent electrical properties, impact resistance and punchability and to a process for producing the same.

2. Description of the Prior Art

Heretofore, phenolic resins have been recognized to be excellent materials for various uses, e.g., in forms such as molded articles, laminated plates and the like from the standpoints of electrical and mechanical characteristics, cost of materials and the like. However, phenolic resins themselves are generally combustible, and in terms of safety of domestic and industrial equipment, i.e., to prevent fires, the demand for rendering phenolic resins flame-retardant has been recently increased gradually. Further, the develop domestic and industrial devices with new functions, the requirement of the characteristics of phenolic resins have become severe. Specifically, in addition to flame-retardancy, more severe requirements have been demanded for phenolic resins with respect to flexbility (plasticity) and impact resistance which are considered general disadvantages of thermosetting resins.

In order to improve the above-mentioned disadvantages, specifically flame-retardancy, of phenolic resins, various methods have been attempted. For example, to render phenolic resins flame-retardant, addition of various kinds of conventional flame-retarders to phenolic resins as disclosed in U.S. Pat. Nos. 3,352,744, 3,377,317 and 3,409,571, has been attempted but this approach is not satisfactory in achieving sufficient flame-retardancy in phenolic resins and also involves deterioration of electrical characteristics, impact resistance and punchability due to the addition of the flame-retarders. Further, in order to enable punching processing at low temperatures (e.g., room temperature) the phenolic resins must be modified with combustible oils or fats whereby a higher degree of flame-retardancy is required for phenolic resins.

Thus, practically useful phenolic resins have not heretofore been produced and development of a method for rendering phenolic resins sufficiently flame-retardant without deteriorating the other characteristics of phenolic resins is strongly desired.

The present invention was achieved in compliance with the above-mentioned requirement.

SUMMARY OF THE INVENTION

An object of the present invention is to provide a flame-retardant phenolic resin and a process for producing the same.

Another object of the present invention is to provide a flame-retardant phenolic resin having excellent electrical and mechanical properties, impact resistance and punchability and a process for producing the same.

The flame-retardant phenolic resin according to the present invention is prepared by a process comprising:

(a) reacting at least one halogenated compound represented by the general formula (I)

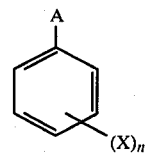

wherein A is $-CH=CH_2$ or $-O-CH_2-CH=CH_2$, X is a chlorine atom or a bromine atom, and n is an integer of 1, 2 or 3, with at least one phenol in the presence of an acidic catalyst, and (b) reacting the resulting reaction product with at least one phenolic acid ester compound containing a phenolic OH group represented by the general formula (II), (III) or (IV)

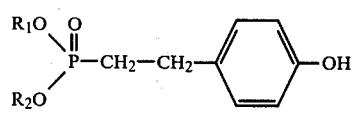

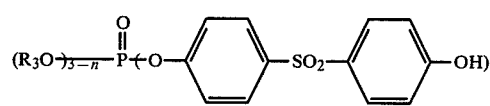

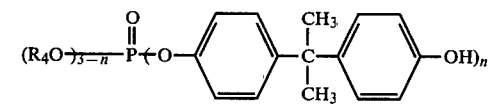

wherein $R_1$, $R_2$, $R_3$ and $R_4$ each represents an unsubstituted or substituted hydrocarbyl group, where $R_1$ and $R_2$ may be the same or different, and n is 1, 2 or 3, and at least one aldehyde or a precursor thereof in the presence of an acidic or alkali catalyst.

DETAILED DESCRIPTION OF THE INVENTION

Where A in the formula (I) is $-CH=CH_2$, the compound is a halogenated styrene and it is considered that the reaction of the halogenated styrene and the phenol, using phenol per se as exemplary of the phenols which can be used in step (a), proceeds, for example, as follows:

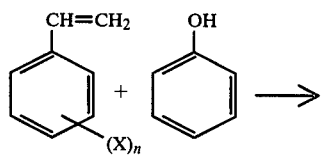

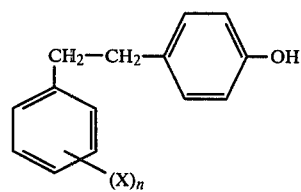

wherein X and n are each as described above.

That is, the product obtained appears to have a structure in which the phenol nucleus is added to the double bond of styrene.

Representative examples of halogenated styrenes which can be used in the present invention include monohalogenated styrenes such as o- or p-chlorostyrene, o- or p-bromostyrene and the like; dihalogenated styrenes such as 2,4- or 2,6-dichlorostyrene, 2,4- or 2,6-dibromostyrene and the like; etc. Mixtures of halogenated styrenes can be employed, if desired. Halogenated styrenes wherein a halogen atom (Cl or Br) is present in the p-position to the vinyl group are suitably used. Further, from a flame-retardant standpoint, bromostyrene is preferred to some extent over chlorostyrene.

Where A in the formula (I) is —O—CH$_2$—CH=CH$_2$, the compound is a halogenated phenyl allyl ether and it is considered that the reaction of the halogenated phenyl allyl ether and the phenol, again using phenol per se as exemplary, proceeds, for example, as follows:

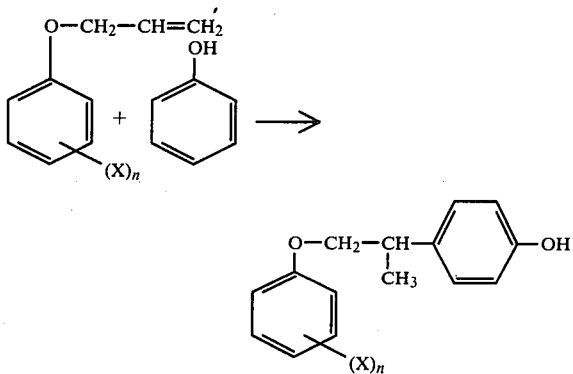

wherein X and n are each as described above.

That is, the product obtained appears to have a structure wherein the phenol nucleus is added to the double bond of the allyl group.

Representative examples of halogenated phenyl allyl ethers which can be used in the present invention include mono-halogenated phenyl allyl ethers such as o- or p-chlorophenyl allyl ether, o- or p-bromophenyl allyl ether and the like; dihalogenated phenyl allyl ethers such as 2,4- or 2,6-dichlorophenyl allyl ether, 2,4- or 2,6-dibromophenyl allyl ether and the like; trihalogenated phenyl allyl ethers such as 2,4,6-trichlorophenyl allyl ether, 2,4,6-tribromophenyl allyl ether and the like; etc. Mixtures of the halogenated phenyl allyl ethers can be employed, if desired. From a flame-retardant standpoint, mono-, di- or tribromophenyl allyl ether is preferred to some extent over chlorophenyl allyl ether.

Further, a mixture of one or more of the halogenated compounds of the general formula (I) where A is —CH=CH$_2$ and one or more of the halogenated compounds of the general formula (I) where A is —O—CH$_2$—CH=CH$_2$ can be employed, if desired.

No specific limitations exist on the phenols used as one of the starting materials of the present invention. Any phenols which will react with formaldehyde to prepare phenolic resins can basically be used. Suitable phenols which can be used in the present invention can be represented by the general formula (V)

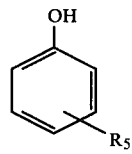

wherein R$_5$ represents an alkyl group, a hydroxy group, an aryl group or an alkylene

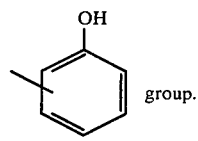

group.

Representative examples of phenols which can be used in the present invention include phenol, o-, m- or p-cresol, 2,3-, 2,4-, 2,5-, 2,6-, 3,4- or 3,5-xylenol, o-, m- or p-ethylphenol, o-, m- or p-propylphenol, o-, m- or p-(n-butyl)phenol, o-, m- or p-(sec.-butyl)phenol, p-(t-butyl)phenol, p-phenylphenol, Bisphenol A, 2,2'-dihydroxyphenyl methane, resorcinol, and the like. Mixtures of phenols can be used if desired. For simplicity herein the term "phenol" is used to describe both phenol per se and other suitable phenols.

The molar ratio of the compound represented by the formula (I) to the phenol in step (a) of the process of this invention is stoichiometrically 1:1, but from a practical standpoint a preferred amount of the compound represented by the formula (I) is about 0.05 to about 0.5 mole, preferably about 0.1 to about 0.3 mole, per mole of the phenol and the residual amount of the phenol is utilized in the subsequent reaction in step (b) with the compound of the general formula (II), (III) or (IV). If the amount of the compound represented by the formula (I) is below about 0.5 mole per mole of the phenol, the improvement in the flame-retardancy and flexibility of the resins ultimately obtained is not sufficient, and, on the other hand, if the amount thereof exceeds 0.5 mole per mole of the phenol, the mechanical properties such as the bending strength of the resins ultimately obtained tend to deteriorate.

The reaction of the compound represented by the formula (I) and the phenol is conducted in the presence of an acidic catalyst. Conventional acidic catalysts can be used as the acidic catalyst employed in the present invention. Representative examples of suitable acidic catalysts which can be used in the present invention include trifluoroborate complexes (e.g., trifluoroboron phenolate, trifluoroboron etherate, etc.), p-toluenesulfonic acid, sulfuric acid, hydrochloric acid or the like.

The amount of the acidic catalyst used in step (a) in the present invention ranges from about 0.01 to about 1.0% by weight, preferably from about 0.05 to about 0.5% by weight, based on the weight of the compound of the formula (I).

No limitation exists in the reaction conditions used in step (a), but the reaction is generally conducted at a temperature of from about 60° to about 150° C., preferably from about 80° to about 130° C., for about 10 to about 300 minutes, preferably about 30 to about 120 minutes. Further, the reaction is generally conducted under atmospheric pressure although sub- and superatmospheric pressures can be used, if desired.

The reaction product of the compound represented by the formula (I) and the phenol obtained in step (a) as described above is then reacted with one of the abovedescribed phosphoric acid ester compounds containing a phenolic OH group of the general formula (II), (III) or (IV) and an aldehyde or a precursor thereof (hereinafter described) to produce a condensation product thereby obtaining modified flame-retardant phenolic resins. In the above general formulae (II), (III) and (IV), representative examples of hydrocarbyl groups are alkyl groups having 1 to 4 carbon atoms and aryl groups.

The phenolic resins (the final product) produced in the present invention can be any of a novolak and a resole type phenolic resin. This merely depends upon whether an acidic catalyst or an alkali catalyst is used in step (b). In other words, where an acidic catalyst is used, a so-called novolak type phenolic resin is obtained and where an alkali catalyst is used, a so-called resole type phenolic resin is obtained. Therefore, for simplicity, the following explanation will be directed to the preparation of a resole type phenolic resin.

Representative examples of phosphoric acid ester compounds represented by the formula (II) which can be used in the present invention include bis($\beta$-chloroethyl) 2-(4-hydroxyphenyl)ethyl phosphonate, bis($\beta$-chloropropyl) 2-(4-hydroxyphenyl)ethyl phosphonate, dimethyl 2-(4-hydroxyphenyl)ethyl phosphonate, diethyl 2-(4-hydroxyphenyl)ethyl phosphonate, bis($\omega$-chlorobutyl) 2-(4-hydroxyphenyl)ethyl phosphonate, di-n-butyl 2-(4-hydroxyphenyl)ethyl phosphonate, di-isobutyl 2-(4-hydroxyphenyl)ethyl phosphonate, diphenyl 2-(4-hydroxyphenyl)ethyl phosphonate, bis(2,3-dichloropropyl) 2-(4-hydroxyphenyl)ethyl phosphonate, bis($\beta$-bromoethyl) 2-(4-hydroxyphenyl)ethyl phosphonate, bis($\beta$-bromopropyl) 2-(4-hydroxyphenyl)ethyl phosphonate, bis($\omega$-bromobutyl) 2-(4-hydroxyphenyl)ethyl phosphonate, bis(2,3-dibromopropyl) 2-(4-hydroxyphenyl)ethyl phosphonate, and the like.

Representative examples of phosphoric acid ester compounds represented by the formula (III) which can be used in the present invention include diphenyl p-(p'-hydroxyphenylsulfonyl)phenyl phosphate, dicresyl p-(p'-hydroxyphenylsulfonyl)phenyl phosphate, dimethyl p-(p'-hydroxyphenylsulfonyl)phenyl phosphate, diethyl p-(p'-hydroxyphenylsulfonyl)phenyl phosphate, di-n-butyl p-(p'-hydroxyphenylsulfonyl)phenyl phosphate, phenyl di-p-(p'-hydroxyphenylsulfonyl)phenyl phosphate, cresyl di-p-(p'-hydroxyphenylsulfonyl)phenyl phosphate, methyl di-p-(p'-hydroxyphenylsulfonyl)phenyl phosphate, ethyl di-p-(p'-hydroxyphenylsulfonyl)phenyl phosphate, n-butyl di-p-(p'-hydroxyphenylsulfonyl)phenyl phosphate and the like.

Representative examples of phosphoric acid ester compounds represented by the formula (IV) which can be used in the present invention include diphenyl p-(p'-hydroxyphenylisopropylidene)phenyl phosphate, dicresyl p-(p'-hydroxyphenylisopropylidene)phenyl phosphate, dimethyl p-(p'-hydroxyphenylisopropylidene)phenyl phosphate, diethyl p-(p'-hydroxyphenylisopropylidene)phenyl phosphate, di-n-butyl p-(p'-hydroxyphenylisopropylidene)phenyl phosphate, phenyl di-p-(p'-hydroxyphenylisopropylidene)phenyl phosphate, cresyl di-p-(p'-hydroxyphenylisopropylidene)phenyl phosphate, methyl di-p-(p'-hydroxyphenylisopropylidene)phenyl phosphate, ethyl di-p-(p'-hydroxyphenylisopropylidene)phenyl phosphate, n-butyl di-p-(p'-hydroxyphenylisopropylidene)phenyl phosphate and the like.

Hereinafter the phosphoric acid ester compounds of the general formula (II), (III) or (IV) will, for simplicity of discussion, be designated "phosphoric acid ester compounds".

The above phosphoric acid ester compound reacts with an aldehyde due to the presence of the OH group in the compound and simultaneously is introduced into the phenolic resins.

Representative examples of aldehydes which can be used in the present invention include formaldehyde (including formalin), paraformaldehyde, furfural and the like. Aldehyde precursors such as hexamethylenetetramine also can be used. Hereinafter the term "aldehyde" will be used for simplicity. The use of paraformaldehyde and formaldehyde having a high concentration of about 50 to 80 wt.% is expecially preferred. Such provides various advantages that the step of water removal after the preparation of the final product (i.e., the resin) can be eliminated; it can be used as a solvent to prepare a varnish of the phenolic resin, which is economical; in preparation of a prepreg for laminated plates, safety in the drying step is increased and the exhaust gas is clean since another solvent is not used; in preparation of a prepreg, the permeability to a substrate (specifically a paper substrate) is improved; the efficiency of flame-retardancy and the electrical characteristics become excellent; and the like.

Water is most preferred as the solvent for dissolving the aldehyde on use. However, an organic solvent may be used as long as such as solvent does not degrade the flame-retardancy of the phenolic resins which is a primary object of the present invention. Representative examples of suitable organic solvents which can be used in the present invention include methanol, ethanol, n-propyl alcohol, iso-propyl alcohol, acetone, methyl ethyl ketone, toluene and the like.

The reaction for preparing resole type phenolic resins is conducted in the presence of an alkali catalyst. Any alkali catalysts which are generally used in the art in the preparation of resole resins can be used. Representative examples of alkali catalysts which can be used in the present invention include sodium hydroxide, potassium hydroxide, calcium hydroxide, ammonia, diethylamine, triethylamine and the like. No specific limitation exists in the amount of the alkali catalyst used, but the amount thereof is generally about 0.1 to about 5.0 mole %, preferably about 1.5 to about 3 mole % per mole of the aldehyde. The pH in the reaction system is about 7.5 to about 12.0, preferably from about 8.0 to about 10.0, and the reaction is conducted for about 30 to 300 minutes, preferably, about 60 to about 180 minutes, preferably, under refluxing conditions.

In the case of preparing novolak type phenol resins, an acidic catalyst is used instead of the alkali catalyst. Any acidic catalysts conventionally used in the art in the preparation of novolak resins can be used. Representative examples of acidic catalysts which can be used in the present invention include hydrochloric acid, p-toluenesulfonic acid, sulfuric acid, acetic acid, oxalic acid or the like. The reaction is conducted at a pH of from about 2 to about 6. Other reaction conditions are the same as in the preparation of resole resins.

The amount of the phosphoric acid ester compound used in step (b) is generally from about 0.01 to about 0.3 mole, preferably from about 0.03 to about 0.15 mole, per equivalent of phenolic hydroxy group. Further, it is preferred for the total amount of the compound represented by the formula (I) and the phosphoric acid ester compound represented by the formula (II), (III) or (IV) to fall within the range of about 0.06 to about 0.8 mole, preferably about 0.11 to about 0.45 mole, per equivalent of phenolic hydroxy group used in all of the reaction steps. If the total amount of the phosphoric acid ester compound and the phenol is above 0.8 mole, adhesiveness, bending strength and electrical properties of the final product (the modified phenolic resin) tend to be deteriorated and also the solubility of the resin in water tends to be poor, while if the total amount of the phosphoric acid ester compound and the phenol is below 0.06 mole, preferred effects cannot be obtained in the resin in terms of flame-retardancy and plasticity.

In this connection, with respect to the plasticity of the ultimate phenol resin, in using conventional flame-retarders which are subsequently added to the resin, a deterioration of the plasticity of the resin was observed as one of various characteristic deteriorations, but according to the present invention, an improvement in the plasticity of the resin can be observed and the effect is marked within the range reacted above of the total amount of the compound represented by the formula (I) and the phosphoric acid ester compound represented by the formula (II), (III) or (IV).

No specific limitations exist in the amount of the aldehyde used in step (b) as long as the amount of the aldehyde is sufficient to allow the reaction of step (b) to proceed smoothly. The amount of aldehyde used in step (b) generally ranges from about 1 to about 2 moles, preferably from about 1.2 to about 1.5 moles, per equivalent of phenolic hydroxy group used in all of the reaction steps.

No specific limitations exist in the reaction conditions for the reaction of the reaction product obtained in step (a), one of the phosphoric acid ester compounds represented by the formula (II), (III) or (IV), and the aldehyde, but the reaction is generally conducted at a temperature of about 80° to about 110° C. for about 60 to 300 minutes under refluxing conditions. Further, the reaction is generally conducted under atmospheric pressure, although subatmospheric and superatmospheric pressures can also be employed. After completion of the reaction, water may be, if desired, removed from the reaction mixture under reduced pressure, preferably at about 10 to 200 mm Hg.

Thus, process of the present invention is characterized by reacting a reaction product which is obtained by reacting a compound represented by the formula (I) and a phenol in the presence of an acidic catalyst, one of the phosphoric acid ester compounds containing a phenolic OH group represented by the formula (II), (III) and (IV), and an aldehyde, e.g., as a solution having a concentration of about 50 to 80 wt.% of paraformaldehyde, in the presence of an acidic or alkali catalyst and, as a result, phenolic resins having excellent water-solubility and flame-retardant properties can be obtained. An aqueous solution or an organic solvent solution can be employed for the aldehyde. Representative examples of organic solvents which can be used include methyl alcohol, ethyl alcohol, propyl alcohol, butyl alcohol, amyl alcohol, hexyl alcohol and the like.

The phenolic resins thus obtained can be employed in various uses such as the preparation of laminated plates, the preparation of paints and the like. Since the phenolic resins obtained according to the present invention per se have excellent flame-retardant properties, they can be used without the necessity for flame-retardant additives as in the prior art. However, in order to obtain an even further enhanced flame-retardancy, other conventional flame-retarders or flame-retarding assistants may be added to the phenolic resins for use, if desired. Representative examples of suitable conventional flame-retarders or flame-retarding assistants which can be additionally used in the present invention include phosphoric acid esters (e.g., triphenyl phosphate, tricresyl phosphate, diphenyl cresyl phosphate, tributyl phosphate, tris(2-chloroethyl) phosphate, tris(2-chloropropyl) phosphate, tris(2,3-dichloropropyl) phosphate, tris(2,3-dibromopropyl) phosphate and the like), halogenated compounds (e.g., tetrabromobutane, tetrabromobisphenol A, pentabromodiphenyl ether, hexabromobenzene, pentabromotoluene and the like), antimony trioxide, barium borate and the like. The amount of the flame-retarders or flame-retarding assistants is not specifically limited as long as the inherent properties of the phenolic resins are not deteriorated, but the amount thereof generally ranges from about 10 to about 30% by weight, preferably from about 15 to about 25% by weight, based on the weight of the modified phenolic resin of this invention. Further, the modified flame-retardant phenolic resins of this invention can also be mixed with the flame-retardant phenolic resins produced as disclosed in Japanese Patent Applications Nos. 63740/76 and 87459/76 in which a compound of the above described general formula (I) is reacted with a phenol in the presence of an acidic catalyst and then the reaction product obtained is reacted with a phenol in the presence of an acidic catalyst to produce a novolak type phenol resin or in the presence of an alkali catalyst to produce a resole type phenol resin.

Further, the flame-retardant phenolic resins according to the present invention may be used directly for various uses but are generally used by adding a solvent such as methanol or a methanol-toluene mixed solvent to obtain a varnish thereof.

Furthermore, the flame-retardant phenolic resins according to the present invention exhibit particularly superior results when used in the preparation of laminated plates. For example, a substrate such as paper, fabric, glass fiber cloth, synthetic fiber cloth, glass fiber non-woven cloth, synthetic fiber non-woven cloth or the like may be impregnated with a varnish prepared by dissolving the flame-retardant phenolic resins in a solvent and the impregnated material is dried to prepare a prepreg. Several individual prepregs thus obtained are piled and press-molded under heating (e.g., at a temperature of about 140° to about 170° C. and a pressure of about 70 to about 150 kg/cm$^2$ for around 40 to 90 min.) to prepare a laminated plate having excellent flame-retardant property.

Specifically, the phenolic resins prepared using the phosphoric acid ester compound as in this invention have excellent plasticity as well as flame-retardancy. The plasticity of the resins markedly affects the punchability of laminated plates. Therefore, by the use of the flame-retardant phenolic resins according to the present invention it is not necessary to use oils, such as tung oil, which are conventionally used as plasticizers and, as a result, the amount of flame-retarders or flame-retarding assistants can be reduced.

Additionally, since according to the present invention the phenolic resins are modified with the flame-retarder rather than such being simply added, there is no deterioration in the impact resistance, punchability, electrical characteristics, etc. and as a result the various characteristics generally required in flame-retardant phenolic resins are met.

The present invention will now be illustrated more specifically by reference to the following examples, but the present invention is not to be construed as being limited to these examples. Unless otherwise indicated, all parts, percents, ratios and the like are by weight.

EXAMPLE 1

188 g of phenol, 20 g of o-bromostyrene and 2 g of p-toluenesulfonic acid were charged in a reaction vessel and the reaction was conducted at 130° C. for 180 min. After cooling to room temperature, 10 g of diphenyl p-(p'-hydroxyphenylsulfonyl)phenyl phosphate, 240 g of formalin (37% formaldehyde aqueous solution) and 10 ml of a 25% aqueous ammonia solution were added to the resulting reaction solution. The reaction was further conducted at 100° C. for 120 min. under refluxing conditions. After completion of the reaction, water in the reaction product was removed under heating at 150° C. at a reduced pressure of 50 mm Hg. When the temperature of the contents reached 100° C., the pressure in the reaction vessel was returned to atmospheric pressure and 180 g of methanol was added to obtain a varnish.

The varnish obtained was impregnated into a Kraft paper having a thickness of 10 mils and dried to obtain a prepreg having a resin content of 25%. Ten sheets of the prepreg obtained were superposed and heat pressed at 150° C. at 100 kg/cm² for 60 min. to obtain a laminated plate having a thickness of about 1.6 mm. Flame-retardancy testing and impact resistance testing of the laminated plate produced was conducted.

A copper foil having a thickness of 35 microns was bonded to another laminated plate obtained as described above to obtain a copper-surface laminated plate. This laminated plate was used for optimum punching temperature testing and insulation resistance testing after boiling treatment (after peeling off the copper foil).

The results obtained are shown in Table 1 below.

EXAMPLE 2

15 parts of tricresyl phosphate and 3 parts of antimony trioxide were added to 100 parts of the varnish obtained in Example 1.

Using the resulting varnish, two types of laminated plates were prepared in the same manner as described in Example 1 and were subjected to the testing as described in Example 1.

The results obtained are shown in Table 1 below.

EXAMPLE 3

216 g of m-cresol, 100 g of p-chlorostyrene and 0.3 g of trifluoroborate monoethyl ether complex were charged in a reaction vessel and the reaction was conducted at 80° C. for 120 min. After cooling to room temperature, 40 g of diethyl p(p'-hydroxyphenylisopropylidene)phenyl phosphate, 290 g of formalin (37% formaldehyde aqueous solution) and 6 ml of diethylamine were added and the reaction was further conducted at 100° C. for 90 min. After completion of the reaction, water in the resulting reaction product was removed at 150° C. at a reduced pressure of 50 mm Hg. When the temperature of the contents reached 105° C., the pressure in the reaction vessel was returned to atmospheric pressure and 270 g of methanol was added to obtain a varnish.

Using this varnish, two types of laminated plates were prepared in the same manner as described in Example 1 and were subjected to the testing as described in Example 1.

The results obtained are shown in Table 1 below.

EXAMPLE 4

The same procedures as in Example 2 were followed except that 100 parts of the varnish obtained was used and laminated plates for testing were produced as described in Example 1.

The results obtained are shown in Table 1 below.

EXAMPLE 5

188 g of phenol, 70 g of o-chlorostyrene and 3 g of p-toluenesulfonic acid were charged in a reaction vessel and the reaction was conducted at 130° C. for 90 min. After cooling to room temperature, 25 g of diphenyl p(p'-hydroxyphenylsulfonyl)phenyl phosphate, 195 g of formalin (37% formaldehyde aqueous solution) and 8 ml of triethylamine were added to the resulting reaction product and the reaction was further conducted at 100° C. for 180 min. under refluxing conditions. After completion of the reaction, water in the reaction solution was removed under heating at 150° C. at a reduced pressure of 50 mm Hg. When the temperature of the contents reached 100° C., the pressure in the reaction vessel was returned to atmospheric pressure and 210 g of methanol was added to the reaction solution to obtain a varnish.

Using this varnish, two types of laminated plates were prepared in the same manner as described in Example 1 and were subjected to the testing described in Example 1.

The results obtained are shown in Table 1 below.

EXAMPLE 6

The same procedures as described in Example 2 were followed except that 100 parts of the varnish obtained in Example 5 was used. Laminated plates were produced and testing was conducted as described in Example 1.

The results obtained are shown in Table 1 below.

COMPARATIVE EXAMPLE 1

188 g of phenol, 210 g of formalin (37% aqueous solution) and 5.5 ml of a 25% aqueous ammonia were charged in a reaction vessel and the reaction was conducted at 100° C. for 90 min. After completion of the reaction, removal of water from the reaction solution was conducted at 150° C. under a reduced pressure of 150 mm Hg. When the temperature of the contents reached 105° C., the pressure in the reaction vessel was returned to atmospheric pressure and 160 g of methanol was added to obtain a varnish.

15 parts of tricresyl phosphate and 3 parts of antimony trioxide were added to 100 parts of the varnish obtained above.

Using the resulting varnish, two types of laminated plates were prepared in the same manner as described in Example 1 and were subjected to the testing described in Example 1.

The results obtained are shown in Table 1 below.

COMPARATIVE EXAMPLE 2

188 g of m-cresol and 90 g of tung oil and 1 g of p-toluenesulfonic acid were charged in a reaction vessel and the reaction was conducted at 130° C. for 30 min. After cooling to room temperature, 200 g of formalin (37% aqueous solution) and 5.6 ml of a 25% aqueous ammonia solution were added and the reaction was further conducted at 100° C. for 60 min. After completion of the reaction, removal of water from the reaction solution was conducted at 150° C. under a reduced pressure of 150 mm Hg, When the temperature of the contents reached 100° C., the pressure in the reaction vessel was returned to atmospheric pressure and 210 g of methanol was added to obtain a varnish.

Using the resulting varnish, two types of laminated plates were prepared in the same manner as described in Example 1 and were subjected to the testing as described in Example 1.

The results obtained are shown in Table 1 below.

COMPARATIVE EXAMPLE 3

50 g of o-chlorostyrene, 200 g of m-cresol and 5 ml of p-toluenesulfonic acid were charged in a reaction vessel and the reaction was conducted at 150° C. for 30 min. After cooling to room temperature, 300 g of formalin (37% formaldehyde aqueous solution) and 8 ml of a 25% aqueous ammonia solution were added to the resulting reaction solution and the reaction was further conducted at 100° C. for 90 min.

After completion of the reaction, water in the resulting reaction solution was removed in the same manner as described in Example 1 and 180 g of methanol was added to obtain a varnish.

To 100 parts of this varnish were added 15 parts of tricresyl phosphate and 3 parts of antimony trioxide.

Using this varnish, two types of laminated plates were prepared in the same manner as described in Example 1 and were subjected to the testing as described in Example 1.

The results obtained are shown in Table 1 below.

COMPARATIVE EXAMPLE 4

60 g of phenyl di-p(p'-hydroxyphenylsulfonyl)phenyl phosphate, 188 g of phenol, 280 g of formalin (37% formaldehyde aqueous solution) and 5 ml of diethylamine were charged in a reaction vessel and the reaction was conducted at 100° C. for 120 min. under refluxing conditions.

Thereafter, the same procedures as described in Comparative Example 3 were followed.

The results obtained on the laminated plates produced are shown in Table 1 below.

Table 1

| Example No. (Comparative Example No.) | Flame Retardancy*1 | Optimum Punching Temperature*2 (°C.) | Impact Resistance*3 (cm) | Insulation Resistance after Boiling Treatment*4 (Ω) |
|---|---|---|---|---|
| 1 | $\overline{X}$ 25.1 Max 43 | 140–180 | 10 | $1 \times 10^8$ |
| 2 | $\overline{X}$ 3.8 Max 9 | 70 or less | 9 | $3 \times 10^7$ |
| 3 | $\overline{X}$ 11.3 Max 21 | 100–140 | 10 | $8 \times 10^7$ |
| 4 | $\overline{X}$ 1.6 Max 3 | 60 or less | 8.5 | $1 \times 10^7$ |
| 5 | $\overline{X}$ 21.9 Max 39 | 120–160 | 10 | $1 \times 10^8$ |
| 6 | $\overline{X}$ 3.0 Max 7 | 70 or less | 9 | $2 \times 10^7$ |
| (1) | $\overline{X}$ 18.3 Max 37 | 100–120 | 7 | $1 \times 10^7$ |
| (2) | $\overline{X}$ - Max 60 or more | 60 or less | 7.5 | $3 \times 10^7$ |
| (3) | $\overline{X}$ 11.4 Max 23 | 70 or less | 9 | $2 \times 10^7$ |
| (4) | $\overline{X}$ 18.1 Max 26 | 70 or less | 9 | $2 \times 10^7$ |

Notes:
*1According to UL Method, Sub.94
*2According to ASTM D617; optimum temperature at which an evaluation of better than "very good" can be obtained.
*3Two screws were fixed at the center portion of the laminated plate of 50 × 50 cm in a distance of 130 mm and the four corners of the plate were supported. A ball having a weight of 400 g was dropped on the plate and the minimum height of the ball drop at which breakage occurred was measured.
*4According to JIS C-6481
"-":The value was too high and the measurement was impossible.

EXAMPLE 7

188 g of phenol, 55 g of o-bromostyrene and 2 g of p-toluenesulfonic acid were charged in a reaction vessel and the reaction was conducted at 130° C. for 60 min. After cooling to room temperature, 20 g of bis($\beta$-chloroethyl)2-(4-hydroxyphenyl)ethyl phosphonate, 162 g of a 55% formaldehyde aqueous solution and 15 g of a 25% aqueous ammonia solution were added to the resulting reaction solution and the reaction was further conducted at 104° C. for 120 min. under refluxing conditions. After completion of the reaction, 100 g of methanol was added to the resulting reaction solution to obtain a varnish.

This varnish was impregnated into a Kraft paper having a thickness of 10 mils and dried to obtain a prepreg having a resin content of 52%. Ten sheets of the prepreg were superposed and heat pressed at 150° C. at 100 kg/cm² for 60 min. to obtain a laminated plate having a thickness of about 1.6 mm. This plate was used for flame-retardancy testing and impact resistance testing.

A copper foil having a thickness of 35µ was bonded to another laminated plate produced in the same manner to obtain a copper-surface plate. This plate was used for punching temperature testing and insulation resistance testing.

The results obtained are shown in Table 2 below.

EXAMPLE 8

10 parts of tricresyl phosphate and 3 parts of antimony trioxide were added to 100 parts of the varnish obtained in Example 7.

Using this varnish, two types of laminated plates were prepared in the same manner as described in Example 7 and were subjected to the testing as described in Example 1.

The results obtained are shown in Table 2 below.

EXAMPLE 9

216 g of m-cresol, 100 g of 2,4,6-trichlorophenyl allyl ether and 0.3 g of trifluoroborate monoetherate were charged in a reaction vessel and the reaction was conducted at 80° C. for 120 min. After cooling to room temperature, 40 g of bis($\beta$-chloroethyl)-2-(4-hydroxyphenyl)ethyl phosphonate, 130 g of paraformaldehyde (80% aqueous solution), 10 g of triethylamine and 1 g of diethylamine were added to the resulting reaction solution and the reaction was further conducted at 110° C. for 90 min. After completion of the reaction, 220 g of methanol was added to obtain a varnish.

Using this varnish, two types of laminated plates were prepared in the same manner as described in Example 7 and were subjected to the testing as described in Example 1.

The results obtained are shown in Table 2 below.

EXAMPLE 10

The same procedures as described in Example 8 were followed except that 100 parts of the varnish obtained in Example 9 was used. Laminated plates for testing were produced.

The results obtained are shown in Table 2 below.

EXAMPLE 11

188 g of phenol, 70 g of p-chlorostyrene and 3 g of p-toluenesulfonic acid were charged in a reaction vessel and the reaction was conducted at 130° C. for 90 min. After cooling to room temperature, 25 g of bis($\omega$-chlorobutyl)-2-(4-hydroxyphenyl)ethyl phosphonate, 72.4 g of paraformaldehyde (80% aqueous solution), 38.7 g of formalin (37% formaldehyde aqueous solution) and 8 g of diethylamine were added and the reaction was further continued at 104° C. for 180 min. under refluxing conditions. After completion of the reaction and cooling to room temperature, 150 g of methanol and was added to the resulting reaction solution to obtain a varnish.

Using this varnish, two types of laminated plates were prepared in the same manner as described in Example 7 and were subjected to the testing as described in Example 1.

The results obtained are shown in Table 2 below.

EXAMPLE 12

The same procedures as described in Example 8 were followed except that 100 parts of the varnish obtained in Example 11 was used. Laminated plates for testing were produced.

The results obtained are shown in Table 2 below.

COMPARATIVE EXAMPLE 5

216 g of m-cresol, 240 g of formalin (37% aqueous solution) and 1.0 ml of triethylamine were charged in a reaction vessel and the reaction was conducted at 100° C. for 60 min. After completion of the reaction, removal of water from the reaction solution was conducted at 150° C. under a reduced pressure of 100 mm Hg. When the temperature of the contents reached 100° C., the pressure in the reaction vessel was returned to atmospheric pressure and 150 g of methanol was added to obtain a varnish.

10 parts of tricresyl phosphate and 3 parts of antimony trioxide were added to 100 parts of the varnish obtained above.

Using the resulting varnish, two types of laminated plates were prepared in the same manner as described in Example 7 and were subjected to the testing described in Example 1.

The results obtained are shown in Table 2 below.

COMPARATIVE EXAMPLE 6

216 g of m-cresol, 100 g of tung oil and 1.2 g of p-toluenesulfonic acid were charged in a reaction vessel and the reaction was conducted at 60° C. for 60 min. After cooling to room temperature, 200 g of formalin (37% aqueous solution) and 1.5 ml diethylamine were added and the reaction was further conducted at 100° C. for 90 min. After completion of the reaction, removal of water from the reaction solution was conducted at 150° C. under a reduced pressure of 150 mm Hg. When the temperature of the contents reached 100° C., the pressure in the reaction vessel was returned to atmospheric pressure and 180 g of methanol was added to obtain a varnish.

Using the resulting varnish, two types of laminated plates were prepared in the same manner as described in Example 7 and were subjected to the testing described in Example 1.

The results obtained are shown in Table 2 below.

COMPARATIVE EXAMPLE 7

188 g of phenol, 55 g of o-bromostyrene and 2 g of p-toluenesulfonic acid were charged in a reaction vessel and the reaction was conducted at 130° C. for 60 min. After cooling to room temperature, 20 g of di-($\omega$-chlorobutyl)-2-(4-hydroxyphenyl)ethyl phosphonate, 220 g of formalin (37% formaldehyde aqueous solution) and 10 g of a 25% aqueous ammonia solution were added to the resulting reaction solution and the reaction was further conducted at 100° C. for 120 min. under refluxing conditions. After completion of the reaction, water in the resulting reaction solution was removed by heating at 150° C. at a reduced pressure of 50 mm Hg. When the temperature of the contents reached 100° C., the pressure in the reaction vessel was returned to atmospheric pressure and 180 g of methanol was added to obtain a varnish.

Using this varnish, two types of laminated plates were prepared in the same manner as described in Example 7 and were subjected to the testing as described in Example 1.

The results obtained are shown in Table 2 below.

Table 2

| Example No. (Comparative Example No.) | Flame Retardancy*1 | Optimum Punching Temperature*2 (°C.) | Impact Resistance*3 (cm) | Insulation Resistance after Boiling Treatment*4 ($\Omega$) |
|---|---|---|---|---|
| 7 | X 8.7 Max 21 | 100–120 | 10 | $5 \times 10^9$ |
| 8 | X 2.1 | 70 or less | 9.5 | $7 \times 10^8$ |

Table 2-continued

| Example No. (Comparative Example No.) | Flame Retardancy*1 | Optimum Punching Temperature*2 (°C.) | Impact Resistance*3 (cm) | Insulation Resistance after Boiling Treatment*4 (Ω) |
|---|---|---|---|---|
| 9 | Max 6 $\bar{X}$ 5.8 | 80–100 | 10 | $5 \times 10^8$ |
| 10 | Max 11 $\bar{X}$ 1.2 | 60 or less | 8.5 | $1 \times 10^8$ |
| 11 | Max 3 $\bar{X}$ 7.9 | 100–120 | 10 | $2 \times 10^9$ |
| 12 | Max 16 $\bar{X}$ 1.6 | 70 or less | 9 | $3 \times 10^8$ |
| (5) | Max 4 $\bar{X}$ 23.2 | 100–140 | 8 | $1 \times 10^7$ |
| (6) | Max 51 $\bar{X}$ - | 60 or less | 8.5 | $3 \times 10^7$ |
| (7) | Max 60 or more $\bar{X}$ 4.2 Max 10 | 70 or less | 9 | $2 \times 10^7$ |

Notes:
*1, *2, *3 and *4 are the same as defined in Table 1.
"-": See Table 1.

While the invention has been described in detail and with reference to specific embodiments thereof, it will be apparent to one skilled in the art that various changes and modifications can be made therein without departing from the spirit and scope thereof.

What is claimed is:

1. A process for producing a flame-retardant phenolic resin which comprises:
   (a) reacting at least one halogenated compound represented by the general formula (I)

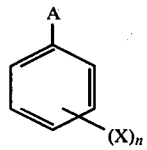

(I)

wherein A is —CH=CH$_2$ or —O—CH$_2$—CH=CH$_2$; X is a chlorine atom or a bromine atom; and n is an interger of 1, 2 or 3, with at least one phenol in the presence of an acidic catalyst, wherein the amount of said halogenated compound is about 0.05 to about 0.5 mole per mole of said phenol and the amount of said acidic catalyst is about 0.01 to about 1.0 percent by weight based on the amount of said halogenated compound, reaction temperature being about 60° to about 150° C., and
   (b) reacting the reaction product obtained in (a) with at least one phosphoric acid ester compound containing a phenolic OH group represented by the general formula (II), (III) or (IV)

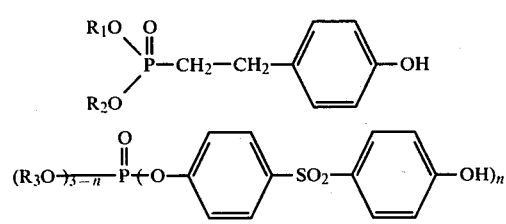

(II)

(III)

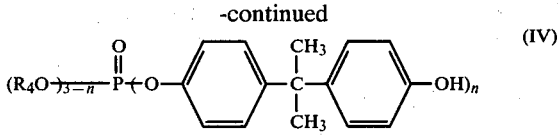

(IV)

wherein R$_1$, R$_2$, R$_3$ and R$_4$ each represent a hydrocarbyl group and R$_1$ and R$_2$ may be the same or different; and n is 1, 2 or 3, wherein the amount of said phosphoric acid ester compound is about 0.01 to about 0.3 mole per equivalent of phenolic hydroxy groups, and at least one aldehyde or a precursor thereof in the presence of an acidic or alkali catalyst, wherein the reaction temperature is about 80° to about 110° C. and wherein, in the case of using said alkali catalyst, the pH in the reaction system is about 7.5 to about 12.0, and wherein, in the case of using said acidic catalyst, the pH in the reaction system is from about 1 to about 6.

2. The process of claim 1, wherein A is —CH=CH$_2$.

3. The process of claim 2, wherein A is —CH=CH$_2$ and n is 1 or 2.

4. The process of claim 3, wherein said halogenated compound is selected from the group consisting of o-chlorostyrene, p-chlorostyrene, o-bromostyrene, p-bromostyrene, 2,4-dichlorostyrene, 2,6-dichlorostyrene, 2,4-dibromostyrene and 2,6-dibromostyrene.

5. The process of claim 1, wherein A is —O—CH$_2$—CH=CH$_2$.

6. The process of claim 5, wherein said halogenated compound is selected from the group consisting of o-chlorophenyl allyl ether, p-chlorophenyl allyl ether, o-bromophenyl allyl ether, p-bromophenyl allyl ether, 2,4-dichlorophenyl allyl ether, 2,6-dichlorophenyl allyl ether, 2,4-dibromophenyl allyl ether, 2,6-dibromophenyl allyl ether, 2,4,6-trichlorophenyl allyl ether and 2,4,6-tribromophenyl allyl ether.

7. The process of claim 1, wherein said phenol is selected from the group consisting of phenol, o-, m- or p-cresol, 2,3-, 2,4-, 2,5-, 2,6-, 3,4- or 3,5-xylenol, o-, m- or p-ethylphenol, o-, m- or p-propylphenol, o-, m- or p-(n-butyl)phenol, o-, m- or p-(sec.-butyl)phenol, p-(t-butyl)phenol, p-phenylphenol, Bisphenol A, 2,2'-dihydroxyphenyl methane, and resorcinol.

8. The process of claim 1, wherein the reaction of the halogenated compound and the phenol in step (a) is conducted for about 10 to about 300 minutes.

9. The process of claim 1, wherein said phosphoric acid ester compound containing a phenolic OH group is selected from the group consisting of bis(β-chloroethyl) 2-(4-hydroxyphenyl)ethyl phosphonate, bis(β-chloropropyl) 2-(4-hydroxyphenyl)ethyl phosphonate, dimethyl 2-(4-hydroxyphenyl)ethyl phosphonate, diethyl 2-(4-hydroxyphenyl)ethyl phosphonate, bis(ω-chlorobutyl) 2-(4-hydroxyphenyl)ethyl phosphonate, di-n-butyl 2-(4-hydroxyphenyl)ethyl phosphonate, diisobutyl 2-(4-hydroxyphenyl)ethyl phosphonate, diphenyl 2-(4-hydroxyphenyl)ethyl phosphonate, bis(2,3-dichloropropyl) 2-(4-hydroxyphenyl)ethyl phosphonate, diphenyl p-(p'-hydroxyphenylsulfonyl)phenyl phosphate, dicresyl p-(p'-hydroxyphenylsulfonyl)phenyl phosphate, dimethyl p-(p'-hydroxyphenylsulfonyl)phenyl phosphate, diethyl p-(p'-hydroxyphenylsulfonyl)phenyl phosphate, di-n-butyl p-(p'-hydroxyphenylsulfonyl)phenyl phosphate, phenyl di-p-(p'-hydroxyphenylsulfonyl)phenyl phosphate, cresyl di-p-(p'-hydroxyphenylsulfonyl)phenyl phosphate, methyl di-p-(p'-hydroxyphenylsulfonyl)phenyl phosphate, ethyl di-p-(p'-hydroxyphenylsulfonyl)phenyl phosphate, n-butyl di-p-(p'-hydroxyphenylsulfonyl)phenyl phosphate, diphenyl p-(p'-hydroxyphenylisopropylidene)phenyl phosphate, dicresyl p-(p'-hydroxyphenylisopropylidene)phenyl phosphate, dimethyl p-(p'-hydroxyphenylisopropylidene)phenyl phosphate, diethyl p-(p'-hydroxyphenylisopropylidene)phenyl phosphate, di-n-butyl p-(p'-hydroxyphenylisopropylidene)phenyl phosphate, phenyl di-p-(p'-hydroxyphenylisopropylidene)phenyl phosphate, cresyl di-p-(p'-hydroxyphenylisopropylidene)phenyl phosphate, methyl di-p-(p'-hydroxyphenylisopropylidene)phenyl phosphate, ethyl di-p-(p'-hydroxyphenylisopropylidene)phenyl phosphate, and n-butyl di-p-(p'-hydroxyphenylisopropylidene)phenyl phosphate.

10. The process of claim 1, wherein said aldehyde or precursor thereof is selected from the group consisting of formaldehyde, paraformaldehyde, furfural and hexamethylenetetramine.

11. The process of claim 10, wherein said aldehyde is an aqueous solution of formaldehyde of a concentration of about 50 to about 80 wt.%.

12. The process of claim 1, wherein the total amount of said halogenated compound and said phosphoric acid ester compound ranges from about 0.06 to about 0.8 mole per equivalent of phenolic OH group.

13. The process of claim 1, wherein the reaction of said resulting reaction product with said phosphoric acid compound in step (b) is conducted at a temperature of from about 80° to about 110° C. for about 60 to about 300 minutes.

14. A flame-retardant phenolic resin which comprises the product obtained on
(a) reacting at least one halogenated compound represented by the general formula (I)

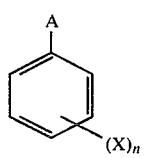

(I)

wherein A is —CH=CH₂ or —O—CH₂—CH=CH₂; X is a chlorine atom or a bromine atom; and n is an integer of 1, 2 or 3, with at least one phenol in the presence of an acidic catalyst, wherein the amount of said halogenated compound is about 0.05 to about 0.5 mole per mole of said phenol and the amount of said acidic catalyst is about 0.01 to about 1.0 percent by weight based on the amount of said halogenated compound, reaction temperature being about 60° to about 150° C., and (b) reacting the reaction product obtained in (a) with at least one phosphoric acid ester compound containing a phenolic OH group represented by the general formula (II), (III) or (IV)

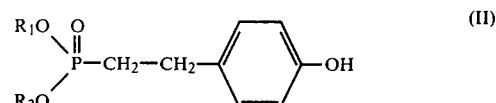

(II)

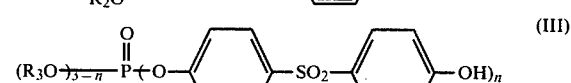

(III)

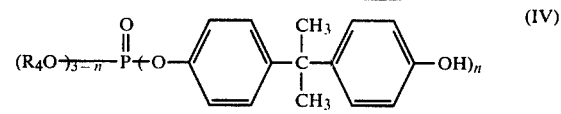

(IV)

wherein R₁, R₂, R₃ and R₄ each represents a hydrocarbyl group and R₁ and R₂ may be the same or different; and n is 1, 2 or 3, wherein the amount of said phosphoric acid ester compound is about 0.01 to about 0.3 mole per equivalent of phenolic hydroxy groups, and at least one aldehyde or a precursor thereof in the presence of an acidic or alkali catalyst, wherein the reaction temperature is about 80° to about 110° C. and wherein, in the case of using said alkali catalyst, the pH in the reaction system is about 7.5 to about 12.0, and wherein, in the case of using said acidic catalyst, the pH in the reaction system is from about 2 to about 6.

15. The phenolic resin of claim 14, wherein A is —CH=CH₂.

16. The phenolic resin of claim 15, wherein A is —CH=CH₂ and n is 1 or 2.

17. The phenolic resin of claim 16, wherein said halogenated compound is selected from the group consisting of o-chlorostyrene, p-chlorostyrene, o-bromostyrene, p-bromostyrene, 2,4-dichlorostyrene, 2,6-dichlorostyrene, 2,4-dibromostyrene and 2,6-dibromostyrene.

18. The phenolic resin of claim 14, wherein A is —O—CH₂—CH=CH₂.

19. The phenolic resin of claim 18, wherein said halogenated compound is selected from the group consisting of o-chlorophenyl allyl ether, p-chlorophenyl allyl ether, o-bromophenyl allyl ether, p-bromophenyl allyl ether, 2,4-dichlorophenyl allyl ether, 2,6-dichlorophenyl allyl ether, 2,4-dibromophenyl allyl ether, 2,6-dibromophenyl allyl ether, 2,4,6-trichlorophenyl allyl ether and 2,4,6-tribromophenyl allyl ether.

20. The phenolic resin of claim 14, wherein said phenol is selected from the group consisting of phenol, o-, m- or p-cresol, 2,3-, 2,4-, 2,5-, 2,6-, 3,4- or 3,5-xylenol, o-, m- or p-ethylphenol, o-, m- or p-propylphenol, o-, m- or p-(n-butyl)phenol, o-, m- or p-(sec.-butyl)phenol, p-(t-butyl)phenol, p-phenylphenol, Bisphenol A, 2,2'-dihydroxyphenyl methane and resorcinol.

21. The phenolic resin of claim 14, wherein said phosphoric acid ester compound containing a phenolic OH group is selected from the group consisting of bis(β-chloroethyl) 2-(4-hydroxyphenyl)ethyl phosphonate, bis(β-chloropropyl) 2-(4-hydroxyphenyl)ethyl phosphonate, dimethyl 2-(4-hydroxyphenyl)ethyl phosphonate, diethyl 2-(4-hydroxyphenyl)ethyl phosphonate, bis(ω-chlorobutyl) 2-(4-hydroxyphenyl)ethyl phosphonate, di-n-butyl 2-(4-hydroxyphenyl)ethyl phosphonate, di-isobutyl 2-(4-hydroxyphenyl)ethyl phosphonate, diphenyl 2-(4-hydroxyphenyl)ethyl phosphonate, bis(2,3-dichloropropyl) 2-(4-hydroxyphenyl)ethyl phosphonate, diphenyl p-(p'-hydroxyphenylsulfonyl)phenyl phosphate, dicresyl p-(p'-hydroxyphenylsulfonyl)phenyl phosphate, dimethyl p-(p'-hydroxyphenylsulfonyl)phenyl phosphate, diethyl p-(p'-hydroxyphenylsulfonyl)phenyl phosphate, di-n-butyl p-(p'-hydroxyphenylsulfonyl)phenyl phosphate, phenyl di-p-(p'-hydroxyphenylsulfonyl)phenyl phosphate, cresyl di-p-(p'-hydroxyphenylsulfonyl)phenyl phosphate, methyl di-p-(p'-hydroxyphenylsulfonyl)phenyl phosphate, ethyl di-p-(p'-hydroxyphenylsulfonyl)phenyl phosphate, n-butyl di-p-(p'-hydroxyphenylsulfonyl)phenyl phosphate, diphenyl p-(p'-hydroxyphenylisopropylidene)phenyl phosphate, dicresyl p-(p'-hydroxyphenylisopropylidene)phenyl phosphate, dimethyl p-(p'-hydroxyphenylisopropylidene)phenyl phosphate, diethyl p-(p'-hydroxyphenylisopropylidene)phenyl phosphate, di-n-butyl p-(p'-hydroxyphenylisopropylidene)phenyl phosphate, phenyl di-p-(p'-hydroxyphenylisopropylidene)phenyl phosphate, cresyl di-p-(p'-hydroxyphenylisopropylidene)phosphate, methyl di-p-(p'-hydroxyphenylisopropylidene)phenyl phosphate, ethyl di-p-(p'-hydroxyphenylisopropylidene)phenyl phosphate, and n-butyl di-p-(p'-hydroxyphenylisopropylidene)phenyl phosphate.

22. The phenolic resin of claim 14, wherein said aldehyde or precursor thereof is selected from the group consisting of formaldehyde, paraformaldehyde, furfural and hexamethylenetetramine.

23. The process of claim 1, wherein in step (b) the amount of the alkali catalyst is about 0.1 to about 5.0 mole percent per mole of said aldehyde.

24. The phenolic resin of claim 14, wherein the amount of said alkali catalyst in step (b) is about 0.1 to about 5.0 mole percent per mole of said aldehyde.

* * * * *